United States Patent [19]

McIntyre

[11] Patent Number: 5,353,115
[45] Date of Patent: Oct. 4, 1994

[54] SYSTEM AND METHOD FOR GENERATING A DISPLACEMENT WITH ULTRA-HIGH ACCURACY USING A FABRY-PEROT INTERFEROMETER

[75] Inventor: Timothy J. McIntyre, Knoxville, Tenn.

[73] Assignee: Martin Marietta Energy Systems, Inc., Oak Ridge, Tenn.

[21] Appl. No.: 65,285

[22] Filed: May 20, 1993

[51] Int. Cl.$^5$ ............................................. G01B 11/02
[52] U.S. Cl. ................... 356/358; 356/356; 356/352; 250/442.11
[58] Field of Search ............... 356/356, 358, 352, 357, 356/405, 5, 381; 250/442.1

[56] References Cited

U.S. PATENT DOCUMENTS 4,506,154  3/1985  Scire .................................. 250/442.1
4,659,224  4/1987  Monchalin .......................... 356/352

OTHER PUBLICATIONS

The Fabry-Perot Interometer; History, Theory, Practice, and Applications, J. M. Vaughan (Adam Hilger, IOP Pub. Ltd., Bristol, England, 1989) pp. 184–213.
Test and Measurement Catalog/Hewlett Packard Laser Interferometers 1992 pp. 423–426.
Axiom 2/20 Optical Heterodyne Interferometers/ZYGO Laser Measurement Systems, Chapt., 2, pp. 2-1 to 2-44.
Status of a Silicon Lattice Measurement and Dissemination Exercise, R. D. Deslattes and E. G. Kessler, Jr., IEEE Trans' Apr., 91, pp. 92–97.
OPTRAMETER and OPTRALITE Product Bulletins, OPTRA, Peabody, Mass.
Product Bulletin, X-Y Piezo-Flex(TM) Micropositioner, Wye Creek Instruments, Fredrick, Md., Nov. 1988.

Primary Examiner—Davis L. Willis
Assistant Examiner—LaCharles P. Keesee, II
Attorney, Agent, or Firm—Michael E. McKee; James M. Spicer; Harold W. Adams

[57] ABSTRACT

A system and method for generating a desired displacement of an object, i.e., a target, from a reference position with ultra-high accuracy utilizes a Fabry-Perot etalon having an expandable tube cavity for resolving, with an Iodine stabilized laser, displacements with high accuracy and for effecting (as an actuator) displacements of the target. A mechanical amplifier in the form of a micropositioning stage has a platform and a frame which are movable relative to one another, and the tube cavity of the etalon is connected between the platform and frame so that an adjustment in length of the cavity effects a corresponding, amplified movement of the frame relative to the cavity. Therefore, in order to provide a preselected magnitude of displacement of the stage frame relative to the platform, the etalon tube cavity is adjusted in length by a corresponding amount. The system and method are particularly well-suited for use when calibrating a high accuracy measuring device.

21 Claims, 3 Drawing Sheets

SYSTEM AND METHOD FOR GENERATING A DISPLACEMENT WITH ULTRA-HIGH ACCURACY USING A FABRY-PEROT INTERFEROMETER

BACKGROUND OF THE INVENTION

This invention relates generally to means and methods for generating a displacement of an object from a reference position and relates, more particularly, to such means and methods for generating a displacement of known magnitude of an object with relatively high accuracy.

High accuracy measuring devices, such as scanning-tunnelling microscopes, atomic force microscopes, high-precision capacitance gauges, air bearing LVDTs, optical interferometers are known to be difficult, if not impossible, to calibrate with conventional calibration devices because such conventional calibration devices may not possess any greater accuracy than the measuring device desired to be calibrated. Moreover, many of these high accuracy measuring devices are difficult to couple with conventional calibration devices for calibrating purposes.

It would be desirable to provide means and a method for generating, with ultra-high accuracy, a desired displacement of an object from a reference position so that the generated displacement could be used in applications such as the calibration of high accuracy measuring devices.

Accordingly, it is an object of the present invention to provide new and improved system and method for generating a desired displacement of an object with ultra-high accuracy.

A further object of the present invention to provide a new and improved calibration system and method for use when calibrating a high accuracy measuring device.

Another object of the present invention is to provide such a calibration system which can be used as a dimensional calibration tool through a relatively broad range of displacement.

Still another object of the present invention is to provide such a system which is capable of being easily coupled to measurement and test equipment to be calibrated.

SUMMARY OF THE INVENTION

This invention resides in a system and method for generating a desired displacement of an object with ultra-high accuracy wherein the object is movable from a reference position or, with additional means, senses movement of the object relative to the displacement generator.

The system of the invention includes a Fabry-Perot etalon which includes a tube cavity having two ends, a length between the ends which is adjustable from a reference condition. The tube cavity also includes a pair of spherical mirrors disposed adjacent the ends thereof having a reflectivity of at least about 99.99% so as to provide the etalon with a relatively high reflectivity finesse. The tube cavity is disposed in the aconfocal configuration and is arrangable with the object so that an adjustment in length of the tube cavity effects a corresponding displacement of the object from its reference position.

The system also includes means for controllably adjusting the length of the etalon cavity so that in order to provide a desired displacement of the object from a reference position, the length of the tube cavity is adjusted by a corresponding amount.

In one embodiment of the system, the etalon cavity is incorporated within a micropositioning stage having a platform and a stage which are attached to one another for movement of the frame relative to the platform. In this embodiment, the tube cavity is connected generally between the platform and frame of the micropositioning stage so that an adjustment in length of the tube cavity effects an amplified movement of the frame relative to the platform. The etalon and stage cooperate so that the magnitude of the movement of the frame relative to the platform corresponds with the change in length of the etalon tube cavity as the tube cavity length is adjusted from its reference condition. Therefore, in order to provide a preselected displacement of the stage frame relative to the platform, the tube cavity is adjusted in length by a corresponding amount. This embodiment is particularly useful for calibrating a high accuracy measuring instrument.

The method of the invention includes the steps performed by the system of the invention. Such steps include the providing of a Fabry-Perot etalon of the system and controllably adjusting the length of the etalon cavity so that in order to provide a desired displacement of the object from a reference position, the length of the tube cavity is adjusted by a corresponding amount.

DETAILED DESCRIPTION OF AN ILLUSTRATIVE EMBODIMENT

Figure 1:
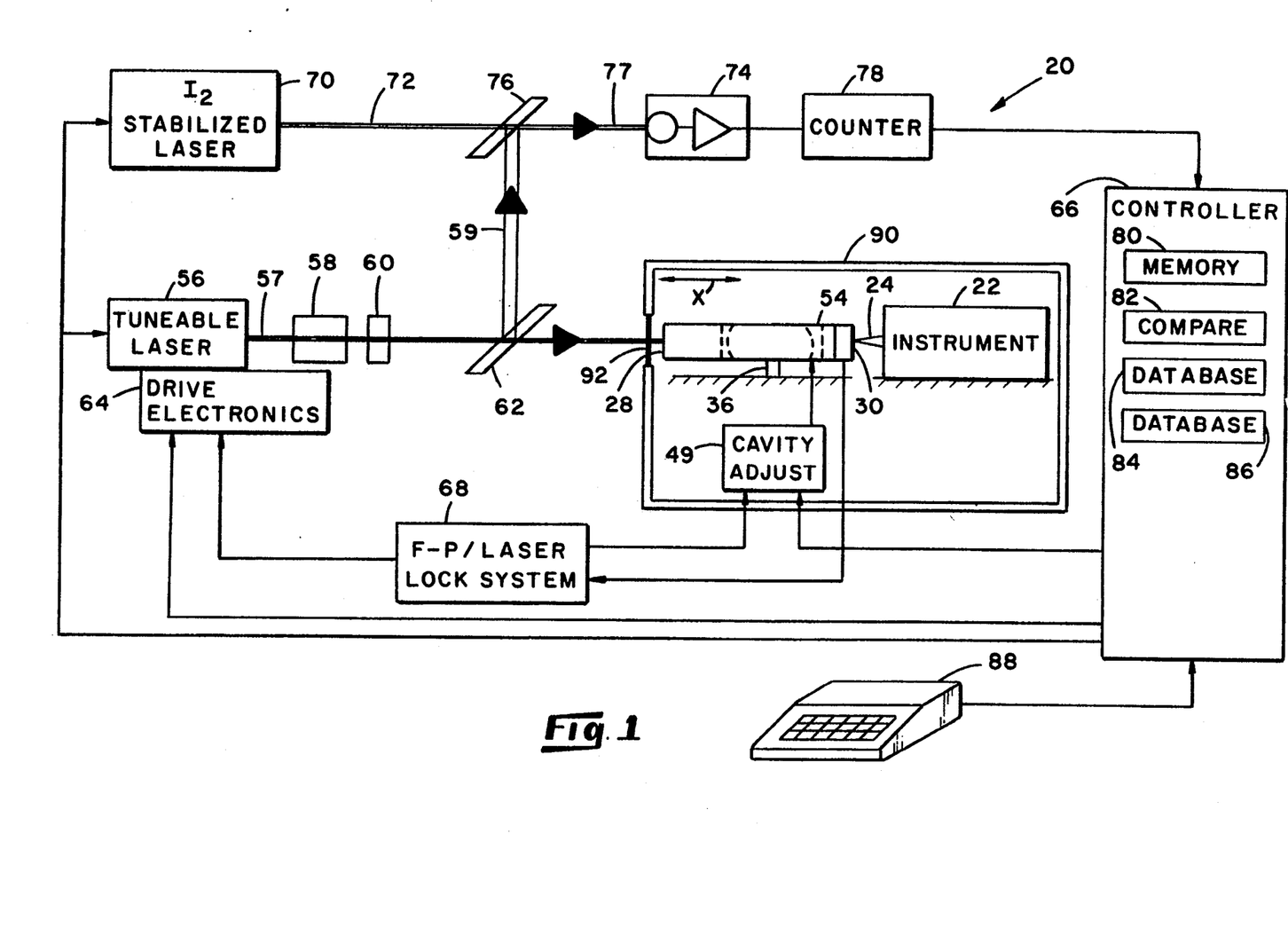
FIG. 1 is a view illustrating schematically a calibration system within which features of the system of the present invention are incorporated.

Turning now to the drawings in greater detail, there is schematically shown in FIG. 1 a system, generally indicated 20, for use when calibrating a high accuracy measurement instrument 22. Although the instrument 22 to be calibrated may be any of a number of instruments capable of measuring and/or distinguishing very small increments of distance, the depicted instrument 22 is adapted to measure increments of length along the illustrated X-coordinate axis. To this end, the instrument 22 includes, for example, a probe 24 which is moved between two locations for the purpose of measuring the distance between the two locations.

Figure 2:
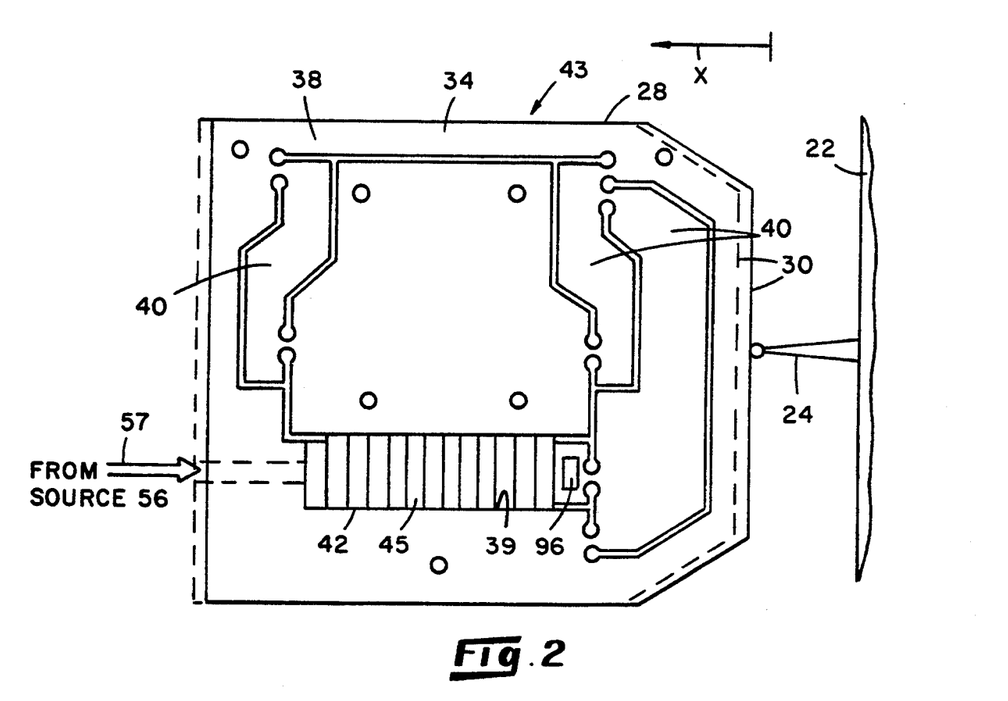
FIG. 2 is a plan view illustrating schematically a micropositioning stage and etalon assembly of the FIG. 1 system.

For purposes of calibrating the instrument 22 and as best shown in FIG. 2, the system 20 includes means providing a movable target 30 against which the instrument probe 24 is positionable. The instrument 22 is calibrated by arranging the target 30 in an initial reference position and then positioning the probe 24 in a first position at which the probe 24 contacts the target 30. The target 30 is then moved away from the probe 24 along the X-axis by a known incremental amount. As the target 30 is moved along the X-axis, the probe 24 is maintained in contact with the target 30 (to minimize sources of calibration errors, such as those which may be generated at the probe/target interface) as the probe 24 is moved to a second position. The instrument 22 monitors the distance traveled by the probe 24 between its first and second positions, and then adjustments are made, as necessary, in the instrument 22 to compensate for any difference between the actual distance traveled by the probe 24 when moved between its first and second positions and the distance presumed to have been traveled by the probe 24.

With reference still to FIG. 2, the system 20 includes a micropositioning stage 28 including a platform 32 and a frame 34 connected together as an integral unit to accommodate movement of the frame 34 relative to the platform 32. The platform 32 is substantially plate-like in form and supported in position upon a pedestal base 36 (FIG. 1). in the alternative, the platform 32 may be suspended from a suitable support from vibration-absorbing, e.g., elastomeric, straps. The frame 34 is also substantially plate-like in form and is positioned about the frame 32 in a substantially co-planar relationship. The platform 34 cooperates with the frame 32 so as to provide an inner opening 39 (FIG. 2) within which adjusting means 49, described hereinafter, is positioned. A network 38 of lever arms 40 accommodate linear movement of the frame 34 relative to the platform 32 in the illustrated X-coordinate direction as the adjusting means 49 is adjusted in length. Moreover, the lever arms 40 cooperate to amplify the adjustment in length of the adjusting means 49 by a large amount, i.e., by a factor of between 30 to 100.

The operating principles of the micropositioning stage 28 are well known so that a detailed description of its components is not believed to be necessary. For example, a micropositioning stage which is comparable to the stage 28 is commercially available under the trade designation X-Y Piezo-Flex Micropositioner from Wye Creek Instruments, and the structure of the commercially-available stage is shown and described in U.S. Pat. No. 4,506,154. To the extent that the referenced patent discloses a exemplary system of lever, or pivot, arms capable of amplifying the movement of the stage frame in response to movement of an object, e.g., a piezoelectric actuator, associated with the stage platform, the disclosure of U.S. Pat. No. 4,506,154 is incorporated herein by reference.

In the depicted micropositioning stage 28, the aforementioned target 30 is provided along one edge of the frame 34, and the output amplification, i.e., the amplification factor, of the frame movement in response to the adjustment in length of the adjusting means 49 is known. Thus, in order to induce displacement of the target 30 by a predetermined, or desired, amount, the adjusting means 49 is altered in length, i.e., elongated by a corresponding, known amount.

Figure 3:
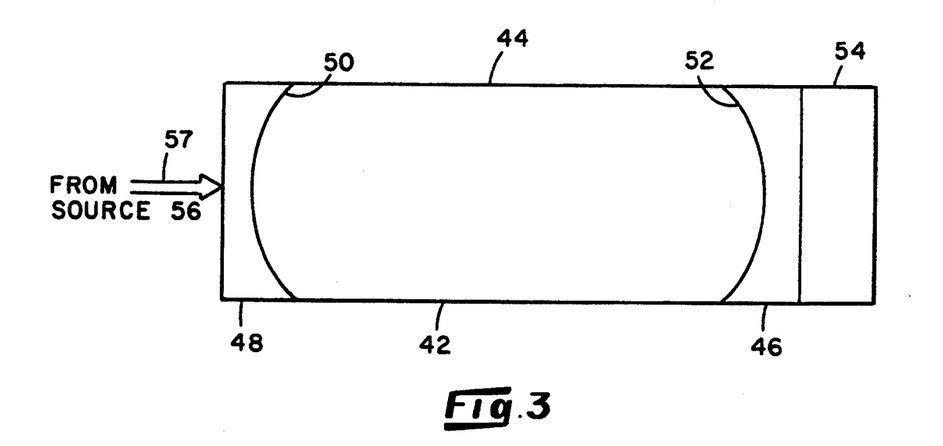
FIG. 3 is a schematic view of the etalon assembly utilized in the assembly of FIG. 2 and drawn to a slightly larger scale.

With reference still to FIGS. 1-3, the adjusting means 49 of the depicted system 20 is a Fabry-Perot interferometer including an etalon 42 having an optical resonant tube cavity 44 capable of expanding and contracting through ultra-small dimensional increments. Collectively, the etalon 42 and stage 28 provide an etalon/stage assembly 43 for the system 20. As best shown in FIG. 3, the tube cavity 44 is elongated in shape having two opposite ends 46 and 48 which are capable of being moved relative to one another in a lengthwise direction. It is a feature of the system 20 that the etalon cavity 44 is mounted within the micropositioning stage 28 so that displacement between the opposite ends 46 and 48 of the cavity 44 effects a corresponding, i.e., amplified, displacement of the frame 34 relative to the platform 32. To this end, one end 46 of the cavity 44 is arranged so as to act against the stage frame 34, and the other end 48 of the cavity 44 is arranged so as to act against one of the lever arms 40 so that an adjustment in the distance between the ends 46, 48 effects a corresponding adjustment in position of the frame 34 relative to the platform 32.

The system 20 also includes means, indicated 49 in FIG. 1, for adjusting the distance between the ends 46, 48 of the cavity 44. The adjusting means 49 of the depicted system 20 includes a piezoelectric actuator 45 (FIG. 2) associated with the cavity 44 for expanding the cavity 44 upon placing of a voltage across the piezoelectric actuator 45. Thus, by controlling the level of the voltage placed across the piezoelectric actuator, ultra-small displacements (of known magnitude) of the cavity end 48 relative to the cavity end 46 can be had.

The internal components and operating principles of the Fabry-Perot etalon 42 are well known in the art so that a greatly detailed description is not believed to be necessary. Briefly and with reference to FIG. 3, the etalon cavity 44 is bounded at each end by a reflecting spherical plate 50 or 52. These plates 50, 52 cooperate to limit the transmission of a beam, e.g., a laser beam, directed therein unless the beam possesses characteristics which match the distance at which the plates 50,52 are spaced from one another. For example, for a beam of preselected frequency, there exists a distance as measured between the plates 50, 52 at which transmission of the beam is at its maximum, or full. At such a distance, the plates 50, 52 effect a resonance of an integral number of standing light rays in the cavity 44.

It is a feature of the depicted etalon 42 that its reflecting spherical plates 50, 52 possess a relatively high reflectivity, e.g., at least about 99.99% and preferably greater than 99.99%. Such a high reflectivity provides the etalon 42 with a relatively high reflectivity finesse, $N_R$, in accordance with the equation:

$$N_R = \pi R^{\frac{1}{2}} (1-R)^{-1}$$

wherein R is the reflectivity of the spherical mirrors 50, 52. If for example, the reflectivity, R, of the mirrors is 99.99%, then the reflectivity finesse, $N_R$, equals about 31,400. Mirrors having a reflectivity of 99.99% are available from Newport Corporation of Fountain Valley, Calif.

Moreover, the dimensional characteristics of the etalon 42 and the laser wavelength with which the etalon 42 is expected to be used provides a relatively high central order of interference, $N_o$, in accordance with the equation:

$$N_o = 2ukd$$

wherein u is the index of refraction of the etalon spacer, k is the inverse wavelength, or wave number, of the laser beam being utilized with the etalon, and d is the etalon spacing. Assuming, for exemplary purposes, that u equals 1.0, k equals 1/632.8 nm, and d equals 0.0254 m, then the central order of interference, $N_o$, equals about 80,280.

The aforediscussed reflectivity finesse, $N_R$, and central order of interference, $N_o$, cooperate to provide an extremely high resolving power, P, of the etalon 42 in accordance with the equation:

$$P = N_o N_R$$

Utilizing the aforementioned illustrative reflectivity finesse, $N_R$, of 31,400 and the aforementioned central order of interference, $N_o$, of 80,280, the resolving power, P, in accordance with the foregoing equation equals $2.5 \times 10^9$. In principle, such a high resolving power enables the etalon 42 to generate a change in length of about $2 \times 10^{-15}$ meters. Upon integration of the etalon 42 with the micropositioning stage 28 possessing a known amplification factor of, for example, 100, then the stage/etalon assembly of the system 20 is capable of generating displacements at the target 30 which range from $10^{-12}$ to $10^{-3}$ meters. The capacity of the stage/etalon assembly to generate such an ultra-small displacement can be readily appreciated when considering the fact that the diameter of a hydrogen atom is between about $1 \times 10^{-10}$ m and $5 \times 10^{-10}$ m.

As will be apparent herein, a tunable laser beam is directed into one end of the cavity 44 through a suitable opening 45 provided in the body of the stage 28 and then tuned (by either adjusting the frequency of the laser beam or adjusting the length of the cavity 44) to obtain a full transmission of the beam. For detecting the beam transmission through the cavity 44, a photo-detector 54 (FIG. 3) is mounted adjacent the end 46 of the cavity 44 opposite the cavity end 48 through which the laser beam is initially directed.

For providing the tunable laser beam received by the etalon cavity 44, the system 20 includes a tunable laser source 56 (FIG. 1) which is aligned with so as to direct its beam, indicated 57 in FIG. 1, toward the cavity end 46. For present purposes, the laser beam 57 is considered to be "in tune" with the etalon cavity 44 when the cavity length provides maximum, or full, transmission of the laser beam 57. With reference still to FIG. 1, a polarizer 58 and a one-quarter wave plate 60 are disposed between the laser 56 and the etalon 42 to minimize optical feedback, and a beamsplitter 62 is positioned in the path of the beam 57 for directing a fraction, indicated 59 in FIG. 1, out of the beam path extending between the laser 56 and the etalon 42. The system 20 also includes means, generally indicated 64, for tuning the laser 56 or, more specifically, the frequency of the beam 57 generated by the laser 56 in order to tune the beam 57 with the cavity 44. Preferably, the tuning means 64 of the depicted system includes an electro-optic modulator for adjusting the length of the laser cavity at a (rapid) rate sufficient to maintain optimum etalon transmission, i.e., as rapidly as adjustments in the frequency of the beam 57 are expected to be necessary.

The system 20 also includes a computer controller 66 for controlling the system operation and also includes a laser lock system 68 connected between the etalon adjusting means 49 and the laser tuning means 64 for automatically maintaining the laser 57 in tune with the etalon cavity 44. During operation of the system 20, the laser lock system 68 operates as a feedback loop which monitors the transmission of the beam 57 at the photodetector 54 and makes adjustments, when appropriate, in either the frequency of the beam 57 or in the length of the cavity 44. As will be apparent herein, one measurement is obtained with the system 20 when the cavity 44 is in a fixed, reference position, thus necessitating that the adjustments be made in the frequency of the beam 57 by way of the tuning means 64 to obtain optimum transmission of the beam 57 through the cavity 44. Other measurements are obtained with the system 20 as the cavity 44 is adjusted in length by the adjusting means 49 to displace the cavity end 48 through a desired distance increment while the laser beam 57 is adjusted to maintain the beam 57 in tune with the cavity 44. Thus, in one instance, the laser lock system 68 adjusts the tunable laser source 56 while the cavity 44 is maintained at a fixed length, and in another instance, the laser lock system 68 adjusts the tunable laser 56 as the etalon cavity 44 is adjusted in length. For purposes of its operation, the laser lock system 68 utilizes the aforementioned electro-optic modulator (of the tuning means 64) and includes some custom servo-electronics to control the tunable laser source 56 and thereby optimize etalon transmission through the cavity 44.

The system 20 also includes a stabilized laser 70, such as an iodine adsorption stabilized HeNe laser, for emitting a laser beam 72 of known, or reference, frequency. The laser 70 is arranged so that its beam 72 is mixed with the fraction 59 of the tunable beam 57 (so as to form a mixed beam 77) and directed toward a high speed photodiode 74. In the depicted system 20, a second beamsplitter 76 is arranged in the path of the reference beam 72 for redirecting the beam fraction 59 directed from the first beamsplitter 62 toward the photodiode 74 with the tunable beam fraction 59.

Associated with the photodiode 74 is a frequency counter 78 which analyzes the mixed beam 77 received by the photodiode 74. In this connection, the mixed beam 77 is detected by the photodiode 74 and suitably analyzed by the frequency counter 78 so that a beat frequency of the mixed beam 77 is obtained.

With reference still to FIG. 1, the controller 66 also includes a memory circuit 80 connected to the frequency counter 78 for storing, with other recorded data, a preselected, i.e., reference, beat count obtained by the counter 78. Furthermore, a comparison circuit 82 is connected between the memory circuit 80 and the counter 78 for comparing the beat frequency count (obtained by the counter 78 as the laser beam 57 is subsequently tuned) to the beat frequency count stored in the memory circuit 80.

The controller 66 also includes a first database 84 containing pre-programmed information relating to the beat frequency of the mixed beam 77. More specifically, the database 84 contains information which correlates a change in beat frequency of the mixed beam 77 (measured by the counter 78) with the displacement of the cavity ends 46, 48 away from one another. In other words, for a predetermined elongation of the cavity 44, there exists a corresponding change in beat frequency of the mixed beam 77, and the magnitude of this change is used from the database 84 during a calibrating operation performed with the system 20. This correlation is calculable within the controller 66 as a function of the known wavelength of the beam generated by the stabilized laser 70.

The controller 66 also contains a second database 86 containing information relating to the displacement between the ends of the etalon cavity 44 and the corresponding amplified displacement of the frame 34 of the micropositioning stage 28 relative to the platform 32 of the stage 28. More specifically, the database 86 contains information which correlates the displacement of the cavity ends 46, 48 relative to one another with the displacement of the frame 34 relative to the platform 32. In other words, for a predetermined displacement of the stage frame 34 relative to the stage platform 32, there exists a prescribed displacement of the cavity ends 46, 48 away from one another, and the magnitude of this displacement is used from the database 86 during an operation of the system 20. This correlation between the displacement of the cavity ends 46, 48 and the displacement of the stage frame 34 and platform 32 is calculable within the controller 66 as a function of the known amplification factor of the frame movement in response to movement of the cavity end 48 relative to the opposite cavity end 46.

It follows from the foregoing that with the aforedescribed information contained within the databases 84 and 86 and with the beat frequency information obtained at the counter 78, the controller 66 is capable of determining the correlation between the change in beat frequency of the mixed beam 77 from a reference beat frequency and the corresponding displacement of the stage frame 32 relative to the platform 32 or, more specifically, the displacement of the target 30 from an initial reference position. Thus, in order that the target 30 is accurately moved from a reference position through a desired distance (for calibrating the instrument 22), the etalon cavity 44 and tunable laser 56 are appropriately adjusted until a corresponding change in the beat frequency of the mixed beam 77, from a reference beat frequency, is detected.

At the outset of a calibration operation, the etalon cavity 44 is positioned in a first, or reference, condition so that the cavity ends 46 and 48 are spaced a predetermined distance apart and so that the target 30 is arranged in a first, or reference, position. To this end, the cavity ends 46 and 48 are spaced relatively close together to accommodate a subsequent expansion of the cavity length to the extent necessary to effect a displacement of the target 30 from its reference position by a desired amount. The instrument 22 to be calibrated (having a contact probe in the depicted example) is positioned adjacent the stage 28 so that its probe 24 contacts the target 30. In the depicted system 20, the target 30 is adapted to move away from the probe 24 as the cavity 44 is subsequently expanded. For initiating the system operation, the controller 66 includes means for initiating commands that a frequency beat be measured, or obtained, while the etalon cavity 44 is in its first, or reference, position. Such commands switch the lasers 56 and 70 ON so that the respective beams 57 and 72 are emitted therefrom. When the beam 57 is directed into the etalon cavity 44 and received by the photodetector 54, the laser adjusts the tunable laser 56 so that the beam 57 emitted by the laser 56 is tuned in accordance with the reference condition of the etalon cavity 44. Upon obtaining the tuned condition of the beam 57 with the cavity 44, the beat frequency of the mixed beam 77 is measured at the counter 78 and stored in the memory 80 as a reference beat frequency.

Information relating to the desired displacement of the target 30 from its initial reference position is input into the controller 66 through, for example, a keyboard 88 so that commands initiated from the controller 66 (following the obtaining of the reference frequency beat) move the target 30 along the X-axis through the desired distance. In this connection and after the reference frequency beat is obtained and recorded in memory 80, appropriate command signals are sent to the cavity adjusting means 49 so that the cavity end 48 begins to move away from the opposite cavity end 46. As the cavity end 48 is moved in this manner, the lock system 68, in conjunction with the photodetector 54 and the tuning means 64, maintains, i.e. locks, the beam 57 in tune with the cavity 44.

It follows that as the beam 57 is altered in order that it be maintained in tune with the cavity 44, the mixed beam 77 is altered as well. This mixed beam 77 is received by the counter 78 and its beat frequency is continually monitored thereby.

As mentioned earlier, the controller 66, with the information in its databases 84 and 86, determines the change in beat frequency of the mixed beam 77 which corresponds to the desired displacement of the target 30. Upon determination of this corresponding, or target, beat frequency change, the target change is recorded in memory 80. As the beat frequency of the mixed beam is continually monitored, the comparison circuit 82 utilizes the monitored data and the stored reference beat frequency to provide a continual monitoring of the change in the beat frequency of the mixed beam 77. The comparison circuit 82 also compares the monitored, i.e., actual, beat frequency change with the target beat frequency change recorded in memory 80. Upon determination that the actual beat frequency change equals the target beat frequency change, appropriate signals are transmitted to the cavity adjusting means 49 so that the elongation of the cavity 44 is immediately halted.

It follows that upon reaching its final position of rest, the target 30 will have been displaced along the X-axis from its initial reference position by the desired amount. The probe 24 of the instrument 22 being calibrated is moved along the X-axis with the target 30 to a second position as the distance traveled by the probe 24 between its reference and second positions is monitored by the componetry of the instrument 22. Adjustments are then made within the instrument 22, as necessary, to compensate for any difference between the actual distance traveled by the probe 24 between its first and second positions and the distance presumed by the instrument componetry to have been traveled by the probe 24 between its first and second positions.

In order to isolate the stage 28, etalon 42 and instrument 22 from external effects which could detrimentally effect the calibrating operation, these items are housed within an environmental chamber 90. Preferably, the chamber 90 is insulated, and the temperature, pressure, and humidity of the interior of the chamber 90 are accurately controlled with suitable means to reduce the effects of these factors on the index of refraction of the beam transmitted therein. Associated with one end of the chamber 90 is a window 92 through which the tunable laser beam 57 is transmitted to the etalon cavity 44.

For illustrative purposes, exemplary dimensions of the etalon 42 and the stage 28 are provided here as follows. The overall length of the etalon assembly, including tube cavity 44 and photodetector 54 is about 47.500 mm, and the overall diameter of the tube cavity 44 is about 11.000 mm. Together, the etalon 42 and stage 28 cooperate to provide a dynamic, working range of displacement of the target 30 along the X-axis of between about $1 \times 10^{-12}$ m to about 1.0 mm with an accuracy of about 1% at one Angstrom to 0.001 part per million at 1.0 mm. Moreover, the uncertainty of measurements obtained with the etalon/stage assembly of the system 20 is about $1.0 \times 10^{-11}$ meters or better.

The depicted system 20 provides a further advantage in that it utilizes a HeNe wavelength as a reference wavelength. Thus, there is no need to take preliminary steps, as may be required with other calibration apparatus, to standardize its operation with a more accurate, or standard reference. Since the system 20 utilizes the Iodine stabilized HeNe wavelength, which wavelength is commonly accepted as a secondary standard reference to the cesium fundamental time standard, the displacements generated with the system 20 can be considered to be obtained directly from a reference standard, and thus uncertainty due to calibration hierarchy is minimized.

It follows that a system and an associated method have been described which accomplish the intended purposes and objectives of the invention. Each of the described system and method utilize Fabry-Perot interferometry (with an expandable etalon cavity) and a micropositioning stage to obtain ultra-small displacements of a target with a high degree of accuracy and over a relatively broad dynamic range. In fact, if a frequency counter is used which is capable of distinguishing a change in beat frequency (of the mixed beam) which is on the order of about 30 GHz, the accuracy and dynamic range of the system will enable the calibration of conventional high-precision instruments which are not currently certified.

It will be understood that numerous modifications and substitutions can be had to the aforedescribed embodiments without departing from the spirit of the invention. For example, although a calibration operation performed with the aforedescribed system 20 has been shown and described as involving a displacement generated by the etalon 42 and amplified through the micropositioning stage 28, a displacement could be utilized for calibration purposes through the etalon 42 alone. To this end, there is illustrated in FIG. 2 a protuberance 96 provided in the portion of the stage 28 disposed adjacent the cavity end 46 of the etalon 42. For purposes of calibrating a device with the etalon 42 alone, the target capable of being displaced through a known increment could be provided by one side of the protuberance 96. Displacements obtained in this manner will be as accurate as those generated with the etalon/stage assembly, but the dynamic range of displacement of the etalon alone will not be as large and may, instead, be limited to between about $1 \times 10^{-12}$ m and $3 \times 10^{-5}$ m.

Figure 4:
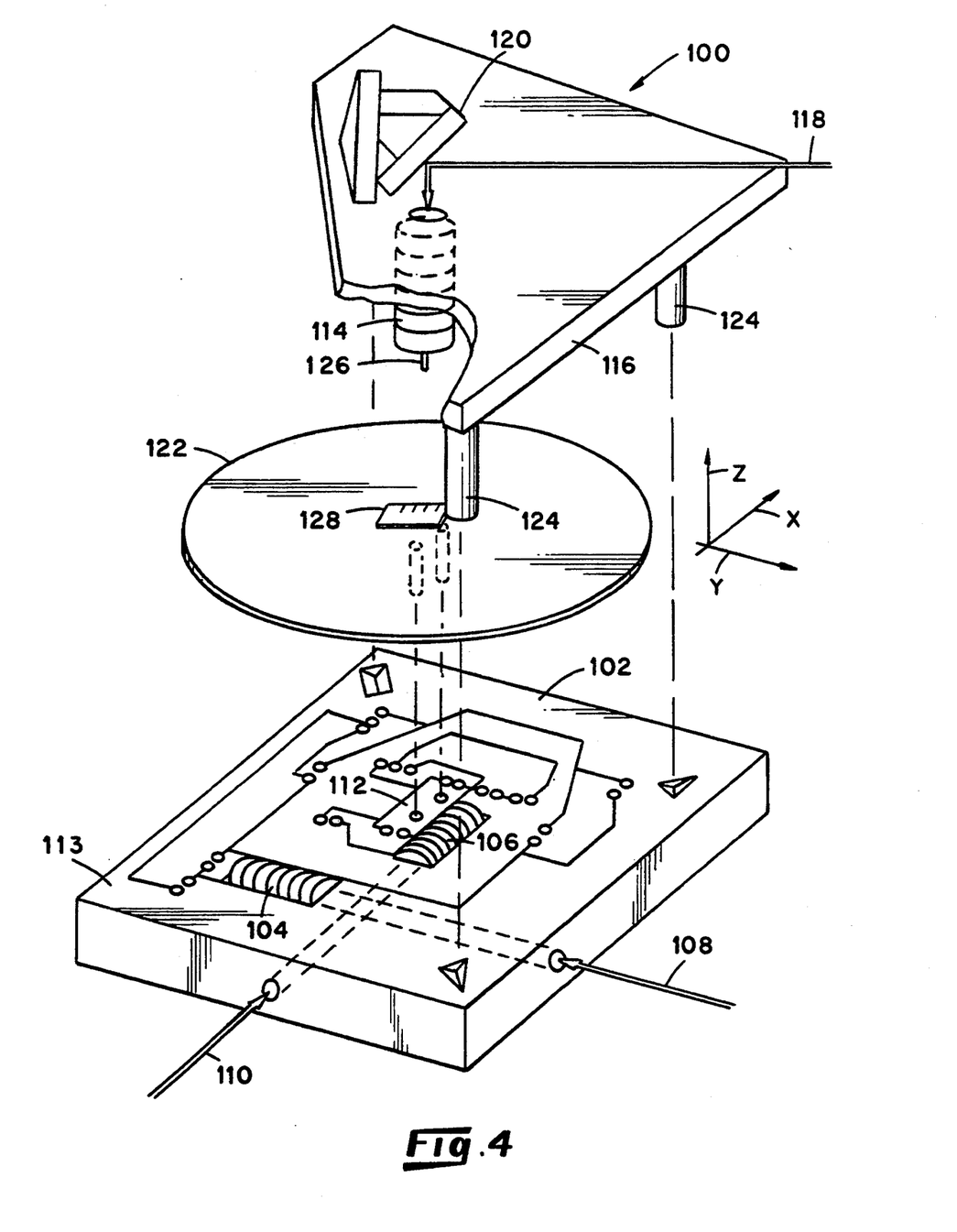
FIG. 4 is a perspective view of an alternative etalon/stage assembly, shown exploded and partially cutaway, capable of being utilized in an alternative system of the invention.

Furthermore, although the system 20 has been shown and described as being utilized for generating a displacement for calibrating purposes, a system in accordance with the broader aspects of the invention can be used for other purposes. For example, there is shown in FIG. 4 an etalon/stage assembly 100 which can be used in place of the etalon/stage assembly 43 depicted in the system 20 for effecting a desired indexing or displacement between two objects from a reference position along any of three coordinate axes. To this end, the etalon/stage assembly 100 includes a stage 102 and two etalon assemblies 104 and 106 positioned in the stage 102 at a right angle to one another. The depicted stage 102 is adapted to generate a displacement of its platform, indicated 112, relative to its frame, indicated 113, along either of the indicated X and Y coordinate directions as the etalon assemblies 104 and 106 are adjusted in length. Control of the length of the etalon assemblies 104 and 106 can be had with laser beams 108 and 110 directed through openings provided in two sides of the stage body.

A sample carrier 122 is supported above the stage platform 112 so that as the platform 112 is displaced along either (or both) of the X and Y axes, the sample carrier 122 (and an object 128 mounted thereon) is displaced along the X and Y axes by an identical amount. A third etalon assembly 114 is arranged along the indicated Z-axis and suitably supported at one end to the underside of the second platform 116 so that a sensing probe 126 (either a STM or an AFM probe) mounted at the opposite, i.e., lower, end of the etalon assembly 114 is disposed adjacent the sample carrier 122. The etalon assembly 114 is adapted to receive a third laser beam 118 directed in one end thereof by way of a mirror assembly 120 associated with the second platform 116. It follows that by controlling the length of each of the etalon assemblies 104, 106 and 114, the sample carrier 122 (or an object 128 mounted thereon) can be displaced relative to the frame 113 of the stage 102 with ultra-high accuracy along the X and Y axes and the sensing probe 126 can be used to sense dimensional detail along the Z axis.

Further still, although the aforedescribed system 20 has been shown and described as being utilized for calibrating a probe 24 adapted to contact a target area during operation, an instrument which employs an alternative probe, such as a capacitive (non-contact) probe, can be calibrated with the system 20. In fact and due in large part to the accuracy of the system 20 over such a relatively broad dynamic range, i.e., $1 \times 10^{-12}$ m to about 1.0 mm, the system 20 can be used to calibrate scanning-tunnelling microscopes, atomic force microscopes, high-precision capacitance gauges, air bearing LVDTs, and optical interferometers. Accordingly, the aforementioned embodiments are intended for the purpose of illustration and not as limitation.

I claim:

1. A system for generating a desired displacement of an object with ultra-nigh accuracy wherein the object is movable from a reference position, the system comprising:

a Fabry-Perot etalon including a tube cavity having two ends, a length between the ends which is adjustable from a reference condition, and a pair of spherical mirrors disposed adjacent the ends thereof having a reflectivity of at least about 99.99% so as to provide the etalon with a relatively high reflectivity finesse, and the tube cavity being disposed in the aconfocal configuration and being arrangable in relation to the object so that an adjustment in length of the tube cavity effects a corresponding displacement of the object from a reference position; and means for controllably adjusting the length of the etalon cavity so that in order to provide a desired displacement of the object from a reference position, the length of the tube cavity is adjusted by a corresponding amount.

2. The system as defined in claim 1 further comprising a micropositioning stage having a platform and a stage which are attached to one another for movement of the frame relative to the platform, and the tube cavity is connected generally between the platform and frame of the micropositioning stage so that an adjustment in length of the tube cavity effects an amplified movement of the frame relative to the platform wherein the magnitude of displacement between the frame and the platform corresponds with the change in length of the tube cavity as the tube cavity length is adjusted from its reference condition so that in order to provide a preselected displacement of the stage frame relative to the platform, the tube cavity is adjusted in length by a corresponding amount.

3. The system as defined in claim 2 wherein the micropositioning stage includes a network of levers which effects an amplified displacement of the frame relative to the platform as one of the levers is displaced relative to the platform, one end of the tube cavity is associated with the stage frame and the other end of the cavity is associated with the one lever so that the stage frame is displaced relative to the platform by an amplification factor as the adjustment in cavity length effects a corresponding displacement between the frame and the one lever.

4. The system as defined in claim 1 wherein the dynamic range of displacement of the object from a reference position is between about $1 \times 10^{-12}$ and about 1.0 mm 5. The system as defined in claim 1 wherein the means for controllably adjusting includes:
- a first laser for generating a stabilized laser beam having a reference frequency;
- a second laser for generating a laser of tunable frequency and wherein the etalon cavity is aligned to receive a portion of the tunable laser beam;
- means for mixing the stabilized laser beam with another portion of the tunable laser beam to provide a mixed beam with a frequency beat;
- means for receiving the mixed beam and measuring the beat thereof;
- means connected between the etalon and the second laser for tuning the beam emitted by the second laser source to provide optimum beam transmission through the etalon tube cavity when the tube cavity is in its reference condition and for maintaining the beam generated by the second laser source in tune with the etalon tube cavity as aforesaid as the tube cavity is adjusted in length from the reference condition; and
- means connected between the etalon tube cavity and the beat measuring means for monitoring the difference between the beat measurement obtained when the length of the tube cavity is in its reference condition and the measured frequency beat as the length of the tube cavity is adjusted from the reference condition; and
- means for comparing the monitored difference in beat measurements to a calculated difference in beat measurements which would exist when the length of the tube cavity is adjusted by a prescribed amount and for halting the adjustment of the tube cavity when the monitored difference equals the calculated difference.

6. The system as defined in claim 1 wherein the Fabry-Perot etalon is a first etalon which is associated with the object so that an adjustment in length of the tube cavity of the first etalon effects a corresponding displacement of the object from its reference position in one coordinate direction, and the system includes
- a second Fabry-Perot etalon including a tube cavity having a construction which is comparable to that of the first etalon and wherein the tube cavity of the second etalon is associated with the object so that an adjustment in length of the tube cavity of the second etalon effects a corresponding displacement of the object from its reference position in another coordinate direction.

7. The system as defined in claim 6 further including a third Fabry-Perot etalon including a tube cavity having a construction which is comparable to that of the first etalon and wherein the tube cavity of the third etalon is arranged in such a relation to the first and second etalons so that an adjustment in length of the tube cavity of the third etalon effects a corresponding displacement of one of its ends in still another coordinate direction.

8. A system for use when calibrating a high accuracy measuring device, the system comprising:
- a Fabry-Perot etalon including a tube cavity having two ends and a length therebetween which is adjustable from a reference condition, the tube cavity being arranged so that an adjustment in length thereof generates a displacement between the ends of the cavity of ultra-high accuracy, and the tube cavity including a pair of spherical mirrors disposed at the ends thereof having a reflectivity of at least about 99.99% so as to provide the etalon with a relatively high reflectivity finesse; and
- means for controllably adjusting the length of the etalon cavity so that in order to generate a displacement of desired length for purposes of calibrating a measurement device, the tube cavity is adjusted in length by a corresponding amount.

9. The system as defined in claim 8 further comprising a micropositioning stage having a platform and a stage which are attached to one another for movement of the frame relative to the platform, and
- the tube cavity is connected generally between the platform and frame of the micropositioning stage so that an adjustment in length of the tube cavity effects an amplified movement of the frame relative to the platform wherein the magnitude of displacement between the frame and the platform corresponds with the change in length of the tube cavity as the tube cavity length is adjusted from its reference condition so that in order to provide a preselected displacement of the stage frame relative to the platform, the tube cavity is adjusted in length by a corresponding amount.

10. The system as defined in claim 9 wherein the micropositioning stage includes a network of levers which effects an amplified displacement of the frame relative to the platform as one of the levers is displaced relative to the platform, one end of the tube cavity is associated with the stage platform and the other end of the cavity is associated with the one lever so that the stage frame is displaced relative to the platform by an amplification factor as the adjustment in cavity length effects a corresponding displacement between the platform and the one lever.

11. The system as defined in claim 9 wherein the dynamic range of displacement of the frame relative to the platform is between about $1 \times 10^{-12}$ m and about 1.0 mm.

12. The system as defined in claim 8 wherein the means for controllably adjusting includes:
- a first laser for generating a stabilized laser beam having a reference frequency;
- a second laser for generating a laser of tunable frequency and wherein the etalon cavity is aligned to receive a portion of the tunable laser beam;

means for mixing the stabilized laser beam with another portion of the tunable laser beam to provide a mixed beam with a frequency beat;

means for receiving the mixed beam and measuring the beat thereof;

means connected between the etalon and the second laser for tuning the beam emitted by the second laser source to provide optimum beam transmission through the etalon tube cavity when the tube cavity is in its reference condition and for maintaining the beam generated by the second laser source in tune with the etalon tube cavity as aforesaid as the tube cavity is adjusted in length from the reference condition; and means connected between the etalon tube cavity and the beat measuring means for monitoring the difference between the beat measurement obtained when the length of the tube cavity is in its reference condition and the measured frequency beat as the length of the tube cavity is adjusted from the reference condition; and means for comparing the monitored difference in beat measurements to a calculated difference in beat measurements which would exist when the length of the tube cavity is adjusted by a prescribed amount and for halting the adjustment of the tube cavity when the monitored difference equals the calculated difference.

13. The system as defined in claim 8 wherein the Fabry-Perot etalon is a first etalon which is arranged so that an adjustment in length of the tube cavity of the first etalon effects a corresponding displacement in one coordinate direction, and the system includes a second Fabry-Perot etalon including a tube cavity having a construction which is comparable to that of the first etalon and wherein the tube cavity of the second etalon is arranged so that an adjustment in length of the tube cavity of the second etalon effects a corresponding displacement in another coordinate direction.

14. A calibration system for use when calibrating a high accuracy measuring device, the system comprising:

a micropositioning stage having a platform and a frame which are attached to one another for movement of the frame relative to the platform;

a Fabry-Perot etalon including a tube cavity having a length which is adjustable from a reference condition, the tube cavity being connected between the platform and frame of the micropositioning stage so that an adjustment in length of the tube cavity effects an amplified movement of the frame relative to the platform wherein the magnitude of the movement of the frame relative to the platform corresponds with the change in length of the etalon tube cavity as the tube cavity length is adjusted from its reference condition;

means for controllably adjusting the length of the etalon cavity so that in order to provide a preselected magnitude of displacement of the stage frame relative to the platform for purposes of calibrating a measurement device, the etalon tube cavity is adjusted in length by a corresponding amount.

15. The system as defined in claim 14 wherein the micropositioning stage includes a network of levers which effect an amplified displacement of the frame relative to the platform as one of the levers is displaced relative to the platform, the tube cavity has two opposite ends which are movable toward and away from one another as the tube cavity is adjusted in length, one end of the cavity being attached to the stage frame and the other end of the cavity being associated with the one lever so that the stage frame is displaced relative to the platform by an amplification factor as the cavity ends are moved toward or away from one another.

16. The system as defined in claim 14 wherein the means for controllably adjusting includes:

a first laser for generating a stabilized laser beam having a reference frequency;

a second laser for generating a laser of tunable frequency and wherein the etalon cavity is aligned to receive a portion of the tunable laser beam;

means for mixing the stabilized laser beam with another portion of the tunable laser beam to provide a mixed beam with a frequency beat;

means for receiving the mixed beam and measuring the beat thereof;

means connected between the etalon and the second laser for tuning the beam emitted by the second laser source to provide optimum beam transmission through the etalon tube cavity when the tube cavity is in its reference condition and for maintaining the beam generated by the second laser source in tune with the etalon tube cavity as aforesaid as the tube cavity is adjusted in length from the reference condition; and means connected between the etalon tube cavity and the beat measuring means for monitoring the difference between the beat measurement obtained when the length of the tube cavity is in its reference condition and the measured frequency beat as the length of the tube cavity is adjusted from the reference condition; and means for comparing the monitored difference in beat measurements to a calculated difference in beat measurements which would exist when the length of the tube cavity is adjusted by a prescribed amount and for halting the adjustment of the tube cavity when the monitored difference equals the calculated difference.

17. A method for generating a desired displacement of an object with ultra-high accuracy wherein the object is movable from a reference position, the method comprising the steps of:

providing a Fabry-Perot etalon including a tube cavity having two ends and a length therebetween which is adjustable from a reference condition, and the tube cavity including a pair of spherical mirrors disposed at the ends thereof having a reflectivity of at least about 99.99% so as to provide the etalon with a relatively high reflectivity finesse;

arranging the tube cavity in such a relation with the object so that an adjustment in length of the tube cavity effects a corresponding displacement of the object from a reference position; and controllably adjusting the length of the etalon cavity so that in order to provide a desired displacement of the object from a reference position, the length of the cavity is adjusted by a corresponding amount.

18. The method as defined in claim 17 further comprising the step of providing a micropositioning stage having a platform and a stage which are attached to one another for movement of the frame relative to the platform, and connecting the tube cavity generally between the platform and frame of the micropositioning stage so that an adjustment in length of the tube cavity effects an amplified movement of the frame relative to the platform wherein the magnitude of displacement between the frame and the platform corresponds with the change in length of the tube cavity as the tube cavity length is adjusted from its reference condition so that in order to provide a preselected displacement of the stage frame relative to the platform during the step of controllably adjusting, the tube cavity is adjusted in length by a corresponding amount.

19. The method as defined in claim 17 wherein the step of controllably adjusting includes the steps of providing a first laser for generating a stabilized laser beam having a reference frequency;

providing a second laser for generating a laser of tunable frequency and wherein the etalon cavity is aligned to receive a portion of the tunable laser beam;

mixing the stabilized laser beam with another portion of the tunable laser beam to provide a mixed beam with a frequency beat;

measuring the beat of the mixed beam;

tuning the beam emitted by the second laser source to provide optimum beam transmission through the etalon tube cavity when the tube cavity is in its reference condition and maintaining the beam generated by the second laser source in tune with the etalon tube cavity as aforesaid as the tube cavity is adjusted in length from the reference condition; and monitoring the difference between the beat measurement obtained when the length of the tube cavity is in its reference condition and the measured frequency beat as the length of the tube cavity is adjusted from the reference condition; and comparing the monitored difference in beat measurements to a calculated difference in beat measurements which would exist when the length of the tube cavity is adjusted by a prescribed amount and halting the adjustment of the tube cavity when the monitored difference equals the calculated difference.

20. A method for calibrating a high accuracy measuring device, the method comprising the steps of:

providing a micropositioning stage having a platform and a frame which are attached to one another for movement of the frame relative to the platform;

providing a Fabry-Perot etalon including a tube cavity having a length which is adjustable from a reference condition;

connecting the tube cavity between the platform and frame of the micropositioning stage so that an adjustment in length of the tube cavity effects an amplified movement of the frame relative to the platform wherein the magnitude of the movement of the frame relative to the platform corresponds with the change in length of the etalon tube cavity as the tube cavity length is adjusted from its reference condition; and controllably adjusting the length of the etalon cavity so that in order to provide a preselected magnitude of displacement of the stage frame relative to the platform for purposes of calibrating a measurement device, the etalon tube cavity is adjusted in length by a corresponding amount.

21. The method as defined in claim 20 wherein the step of controllably adjusting includes the steps of providing a first laser for generating a stabilized laser beam having a reference frequency;

providing a second laser for generating a laser of tunable frequency and wherein the etalon cavity is aligned to receive a portion of the tunable laser beam;

mixing the stabilized laser beam with another portion of the tunable laser beam to provide a mixed beam with a frequency beat;

measuring the beat of the mixed beam;

tuning the beam emitted by the second laser source to provide optimum beam transmission through the etalon tube cavity when the tube cavity is in its reference condition and maintaining the beam generated by the second laser source in tune with the etalon tube cavity as aforesaid as the tube cavity is adjusted in length from the reference condition; and monitoring the difference between the beat measurement obtained when the length of the tube cavity is in its reference condition and the measured frequency beat as the length of the tube cavity is adjusted from the reference condition; and comparing the monitored difference in beat measurements to a calculated difference in beat measurements which would exist when the length of the tube cavity is adjusted by a prescribed amount and halting the adjustment of the tube cavity when the monitored difference equals the calculated difference.

* * * * *